Figure 1:
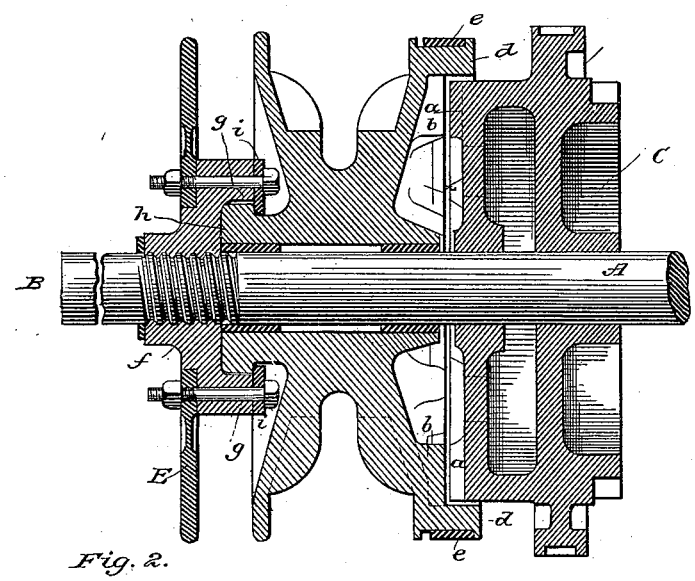

(No Model.)

T. W. HYDE.
Windlass.

No. 231,047.          Patented Aug. 10, 1880.

Attest:
R. F. Barney
Geo. W. Seely

Inventor:
Thomas W. Hyde.
by Ellis Spear
Attorney

N. PETERS, PHOTO-LITHOGRAPHER, WASHINGTON, D. C.

UNITED STATES PATENT OFFICE.

THOMAS W. HYDE, OF BATH, MAINE.

WINDLASS.

SPECIFICATION forming part of Letters Patent No. 231,047, dated August 10, 1880.

Application filed June 24, 1880. (No model.)

*To all whom it may concern:*

Be it known that I, THOMAS W. HYDE, of Bath, in the county of Sagadahoc and State of Maine, have invented a new and useful Improvement in Windlasses; and I do hereby declare that the following is a full, clear, and exact description of the same.

My invention relates to windlasses of that class in which a loose wild-cat is mounted upon the shaft, and which are provided with devices for connecting the loose wild-cat with the shaft or driving-head at the will of the operator.

Heretofore various devices have been suggested for the purpose of connecting at will the fixed driving-head of a windlass with a loose wild-cat, so that at any time the wild-cat could be allowed to run freely upon the shaft, or could be held rigidly upon the shaft and be caused to turn therewith. Such a form has been shown in English Patent No. 2,061 of 1858, in which a series of bolts arranged longitudinally within a fixed drum on the outer end of the windlass-shaft are caused to move simultaneously back and forth to lock or unlock the loose wild-cat.

A loose wild-cat has also been connected with a fixed head by frictional surfaces, as in the English Patent No. 2,916 of 1870, in which a nut provided with a wheel is placed upon a threaded portion of the shaft, whereby, by turning the wheel, the wild-cat is pressed against the frictional surfaces upon the fixed head and held with more or less force in connection therewith.

Many other devices have been shown with simply frictional connection between the wild-cat and the driving-head, or with more or less complicated system of locking devices for forming positive connection between said wild-cat and head.

In that class of devices in which the wild-cat is held upon the head by friction only an advantage is gained in making the connecting devices serve as a brake upon the wild-cat by limiting the amount of pressure applied; but the results show an accompanying disadvantage arising out of the lack of positive connection. In all the positive locking devices heretofore shown there has been more or less of complication or of inconvenience in use.

The object of my invention is to simplify the structure by diminishing the number of working parts without impairing the efficiency or certainty of action in the apparatus.

My invention consists of the combination of a loose wild-cat, provided with projections or recesses upon the inboard side of the wild-cat, fitted to correspond with recesses or projections on the adjacent face of the fixed head, with a threaded nut moving upon a threaded portion of the shaft, provided with a locking-wheel, and connected to the hub of the wild-cat in such a manner that by turning the wheel in one direction the wild-cat may be moved into positive connection with the fixed head, or may be released by the turning of the wheel in the opposite direction, and in combining therewith a band friction-brake.

Figure 2:
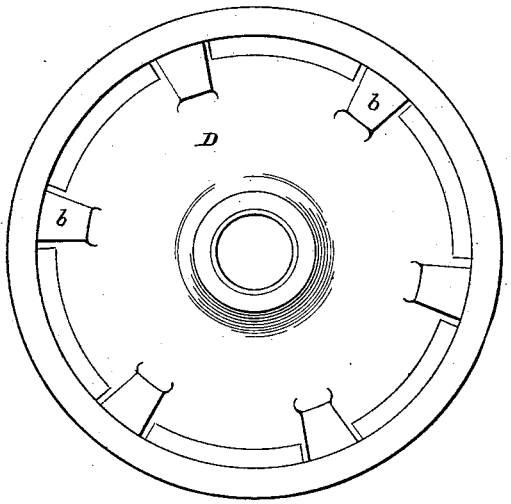
Figure 3:
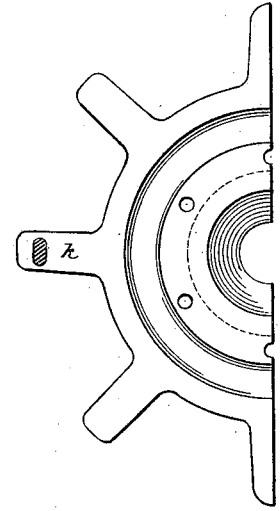

In the drawings hereunto attached, Figure 1 represents a section through the center of the wild-cat, fixed head, locking-wheel, and of the port end of the windlass, showing their relative position upon the shaft. Fig. 2 is a view of the inboard side of the wild-cat, and Fig. 3 a view of the inboard side of the locking-wheel.

In this drawing, A represents the shaft of the windlass, which may be provided with bearings at B B. C represents the driving-head, through which power may be applied in any convenient manner, and which is provided with studs or projections $a$ $a$, arranged radially upon its outer face near the periphery, and adapted to fit into recesses $b$ $b$ similarly arranged on the inboard side of the wild-cat. The wild-cat is marked D. It is of the usual form, except that it is provided with the recess above described, with an overhanging flange and friction-band, and with operating devices hereinafter to be described. The overhanging flange is represented at $d$, and the friction-band upon it is indicated at $e$. The latter is operated independently of the clutching device, and may be applied in the ordinary manner when the wild-cat is released from the driving-head.

The locking-wheel is shown at E. It is provided with a hub, $f$, the flange $g$ of which overhangs the flange $h$ of the outer end of the hub of the wild-cat. A ring, $i$, is bolted to the hub $f$ and extends inwardly over the flange $h$, thereby securing the locking-wheel to the wild-cat. The connection is such as to permit the hub of the wild-cat to turn freely within the connected end of the hub of the locking-wheel. The hub is threaded and moves upon a threaded portion of the shaft, and when turned in one direction forces the wheel toward the driving-head, causing the projections upon the face of one to lock with the recess in the face of the other, whereby the wild-cat is carried with the driving-head.

The wheel E is provided with ordinary handles $k$ about its edge, so that it may be grasped for turning when in any position.

By the device above described I dispense with all movable pawls and locking-pins, while retaining the positive connection between the driving-head and wild-cat, and also retaining the friction-brake.

I am well aware that loose pulleys adapted to be shifted so as to bring projections upon the side into contact with glands keyed upon the shaft are very old, said wheels being provided for moving them laterally both into and out of connection, and I wish it to be understood that I do not broadly claim such a device; but,

Having thus described my invention, what I claim is—

The combination, in a windlass, of a loose wild-cat, having projections or recesses upon its face adapted for connection with projections or recesses upon the adjacent face of the driving-head, of a locking-wheel fitted to move, by rotation upon the shaft, the wild-cat into and out of connection with the driving-head, and of a friction-brake, all substantially as described.

In testimony whereof I have signed my name to this specification in the presence of two subscribing witnesses.

THOS. W. HYDE.

Witnesses:
CHAS. E. HYDE,
F. E. CROMWELL.